March 29, 1966     A. H. ROSHON, JR., ET AL     3,243,768
INTEGRAL DIRECTIONAL ELECTROACOUSTICAL TRANSDUCER FOR
SIMULTANEOUS TRANSMISSION AND RECEPTION OF SOUND
Filed June 1, 1962     6 Sheets-Sheet 1

INVENTORS
ARTHUR H. ROSHON, JR.
DANIEL E. ANDREWS, JR.
BY
ATTORNEYS

March 29, 1966     A. H. ROSHON, JR., ET AL     3,243,768
INTEGRAL DIRECTIONAL ELECTROACOUSTICAL TRANSDUCER FOR
SIMULTANEOUS TRANSMISSION AND RECEPTION OF SOUND
Filed June 1, 1962                        6 Sheets-Sheet 3

INVENTORS
ARTHUR H. ROSHON, JR.
DANIEL E. ANDREWS, JR.
BY
ATTORNEYS

March 29, 1966 A. H. ROSHON, JR., ET AL 3,243,768
INTEGRAL DIRECTIONAL ELECTROACOUSTICAL TRANSDUCER FOR
SIMULTANEOUS TRANSMISSION AND RECEPTION OF SOUND
Filed June 1, 1962 6 Sheets-Sheet 4

INVENTORS
ARTHUR H. ROSHON, JR.
DANIEL E. ANDREWS, JR.
BY
ATTORNEYS

INVENTORS
ARTHUR H. ROSHON, JR.
DANIEL E. ANDREWS, JR.
BY

ATTORNEYS

INVENTORS
ARTHUR H. ROSHON, JR.
DANIEL E. ANDREWS, JR.
BY

ATTORNEYS

United States Patent Office 3,243,768
Patented Mar. 29, 1966

3,243,768
INTEGRAL DIRECTIONAL ELECTROACOUSTICAL TRANSDUCER FOR SIMULTANEOUS TRANSMISSION AND RECEPTION OF SOUND
Arthur H. Roshon, Jr., 1746 Minden Drive, and Daniel E. Andrews, Jr., 3657 Promontory, both of San Diego, Calif.
Filed June 1, 1962, Ser. No. 199,548
12 Claims. (Cl. 340—10)

The invention described herein may be manufactured and used by or for the Government of the United States of America for governmental purposes without the payment of any royalties thereon or therefor.

The instant invention is a continuation-in-part of the matter presented in copending application, Serial No. 617,894, filed October 23, 1956, and now abandoned.

This invention relates to an electro-acoustic transducer and more particularly to an improved transducer for simultaneous reception and transmission of sound with low cross-talk between the transmitting and receiving channels.

Heretofore, two basic systems have been used for the transmission and reception of sound. One system employed two separate transducer assemblies, mechanically and acoustically isolated from each other. In this system one assembly was used as the transmitting element and the other as the receiving element. In the second basic system, the transducer assembly was used alternately as a transmitter and receiver by the employment of a suitable switching means.

Both of the above systems have limitations. In many acoustic applications, there exists a need for simultaneously transmitting and receiving sound within the same frequency band and from a common point of interest with low cross-talk between the transmitting and receiving channels. In addition, it is desirable to train both the transmitting and receiving elements in unison.

In the aforementioned first system, transmitter and receiver isolation results in excessive size as well as in a static or dynamic misalignment of the transmitted and received sound pattern, invariably resulting in marked deterioration in equipment performance with accompanying high cross-talk. In the second of the above systems, though misalignment is not a problem, simultaneous transmitting and receiving of sound is impossible when the transducer assembly is used alternately as a transmitter and receiver.

Further, in addition, it is desirable to provide an assembly wherein the radiating and receiving elements are relatively independent, as regards size, providing control of the frequency characteristics and the band of interest and the required beam width. This is especially true when a relatively small active element is used for the transmitting and receiving function in that one would ordinarily obtain a relatively wide beamwidth in that beamwidth is approximately inversely proportional to the linear dimension of the active elements.

An object of the invention is to provide an improved structure for the transmission and reception of sound waves.

A further object of the invention is to provide an improved structure for the simultaneous transmission and reception of sound waves.

A further object of the invention is to provide an improved structure for the simultaneous transmission and reception of sound waves with low cross-talk between transmitting and receiving channels.

Another object of the invention is to provide a structure for producing sound beams of desired width for simultaneous transmission and reception with low cross-talk between transmitting and receiving channels in an FM sonar system.

An additional object of the invention is to provide an improved structure for producing sound beams having widths relatively independent of the active elements.

An additional object of the invention is to provide a structure producing sound beams of desired widths for simultaneous transmission and reception with low crosstalk between transmitting and receiving channels wherein the beam width is relatively independent of the size of the piezoelectric elements.

Other objects and many of the attendant advantages of this invention will be readily appreciated as the same becomes better understood by reference to the following detailed description when considered in connection with the accompanying drawings wherein:

FIG. 5b is an elevational view of the embodiment of FIG. 5a;

FIG. 6b is a side elevation of the embodiment of FIG. 6a;

Figures 1, 1A:
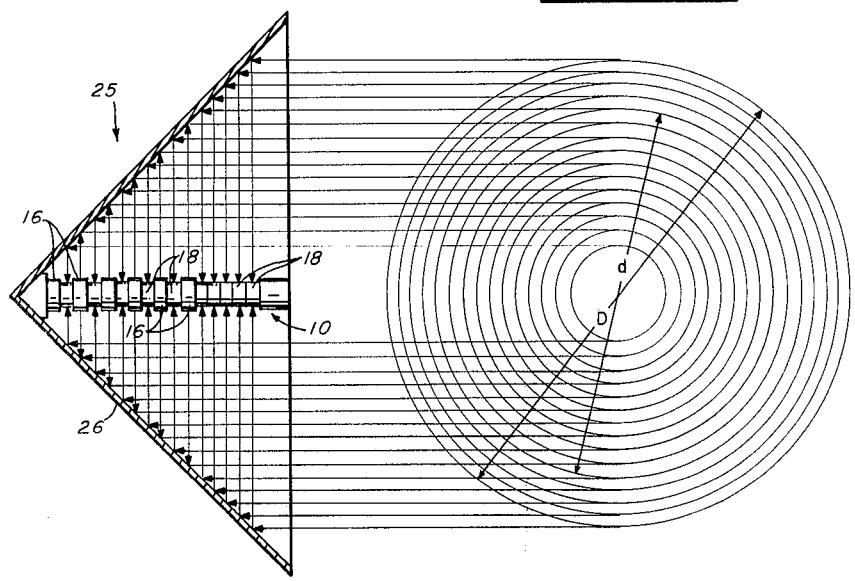
FIG. 1 is a diagrammatic view, partly in vertical section and partly in side elevation of the invention.
FIG. 1a is an elevational view looking into the bell of reflector of FIG. 1.

In the embodiment of FIG. 1 there is shown a transducer assembly 25 comprising a 90° right circular conical reflector 26 having a transducer element 10 positioned therein. The transducer element 10 is mounted at one end in the apex of the conical reflector 26 so that the axis of element 10 is coincident with the axis of revolution of the right circular conical reflector 26.

Figure 2:
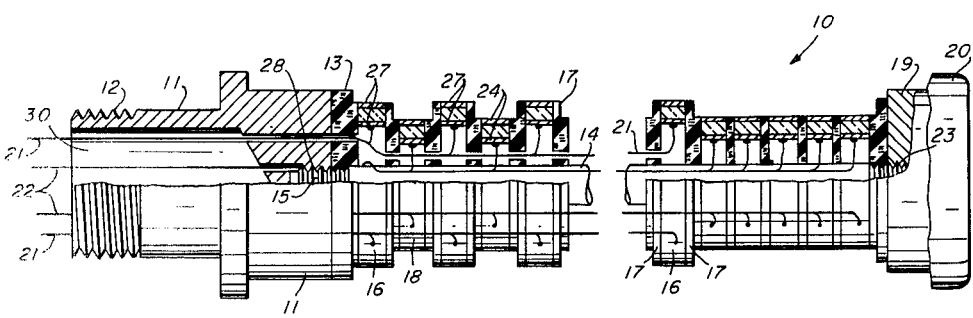
FIG. 2 is a side view, partly in section of one embodiment of the invention.

FIG. 2 shows the transducer element 10 in greater detail. Element 10 comprises a base 11 adapted to be positioned in the apex of a conical reflector 26 by means of threads 12 on the outboard end of the base 11. The other end of base 11 is internally threaded as shown at 28 and a cylindrical strut 14 having external threads 15 on one end thereof is positioned in the threaded portion 28 of the base 11. An insulation member 13 is mounted on the cylindrical strut 14 in abutment with the end of the base 11 remote from the threaded portion 12.

Hollow cylindrical transmitter ring elements 16 having a metallic foil 27 on their inner and outer diameters are positioned on the strut 14. Spaced between alternate transmitting elements 16 are hollow cylindrical receiver elements 18 having a metallic foil 24 on their inner and outer diameters and positioned such that the transmitter and receiver elements are interleaved. As shown in FIG. 2 the interleaved transmitting and receiving elements occupy approximately ⅔ of the distance between the insulation 13 and the end of strut 14. Between the last transmitter element 16 and the end of the outboard end of the strut 14 there are a multiplicity of receiver elements only. However, it is to be understood that the transmitter and receiver elements could be interleaved along the entire distance of the strut 14 instead of as shown. The purpose for not continuing the transmitter elements in the alternating relationship to the end of the strut will be explained subsequently in the discussion of the operation of the structure as shown in FIG. 2.

Isolation washers 17 are mounted on the strut 14 for separating and positioning the transmitter elements 16 from the receiver elements 18. Wires 21 and 22 are introduced through a hollow portion 30 of base 11 and are connected in parallel to the inner and outer metallic foils 27 and 24, of transmitting elements 16 and receiving elements 18, respectively. The leads 21 and 22 are adapted for connection to a transmitter, not shown, and receiver, not shown, respectively. The outboard end of strut member 14 is threaded on its exterior portion as at 23 and a retaining ring 19 which has internal threads, is threadedly engaged with the threaded portion 23 on strut 14 and serves to position the elements 16 and 17 and 18 securely on the strut 14. Finally, a thin walled, acoustically transparent envelope 20 is used to cover the assembled elements.

In assembling the structure of FIG. 2, the base 11, strut 14, and retaining ring 19 are fashioned from metal such as corrosion resistant stainless steel or the like. The insulating member 13 is fabricated from rubber, as shown, and bonded with cement to base 11. Obviously, other isolation materials may be used such as cork or a composite assembly of rubber and cork. The active elements 16 and 18 are fabricated of a piezoelectric material such as quartz, ceramic or the like and are coated on their inner surfaces with a metallic foil and insulated from the strut member 14 and connecting wires 21 and 22 by means of a coating of insulating material such as Glyptal, an alkyd-type synthetic resin, or the like. The isolation washers 17 are shown as being fabricated of rubber and a unicellular rubber has been found satisfactory in use. However, any suitable isolating materials such as cork, plastic or the like could be used. Composite isolating element fashioned from rubber and cork could also be used as desired. The completely assembled structure is then covered with the thin-walled envelope 20 made of a watertight material such as natural or synthetic rubber, suitable plastics or the like.

Figure 3:
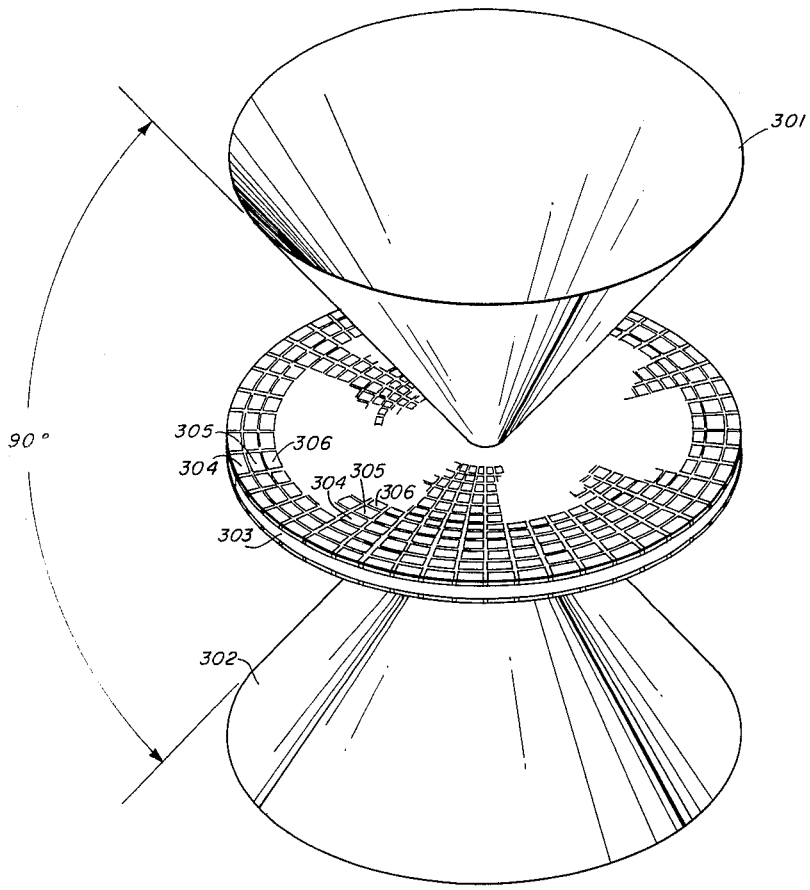
FIG. 3 is a diagrammatic showing of another embodiment of the present invention utilizing 90° circular biconical reflectors.

In the embodiment of FIG. 3 the reflector comprises two conical reflectors 301 and 302 joined at their apex and having a 90° right angle between adjacent reflecting surfaces, as shown. In this embodiment the active elements are positioned on a circular steel disk 303 which lies in a plane bisecting the 90° angle between adjacent surfaces of reflectors 301 and 302, respectively, and which has its center point coincident with the juncture of the apices of the two conical reflectors. Transmitting and receiving elements are positioned on both sides of the steel plate 303 and, as shown, a ring of transmitting elements 304 is positioned next to a ring of receiving elements 305 which abut another ring of transmitting elements 306. The rings alternate between transmitting and receiving elements until the plate 303 is covered. The showing of the FIG. 3 is only a schematic showing and it is to be understood that the composite rings 304, 305 and 306 would comprise a mosaic of transmitting and receiving elements and that the elements would be suitably foiled and insulated from each other and the rings insulated from adjacent rings.

The transducer, as shown in FIG. 3, is omnidirectional in planes parallel to those of the sensitive elements and it is directional in the planes normal to these planes. The transducer exhibits maximum response in the plane of the sensitive elements.

Figure 4:
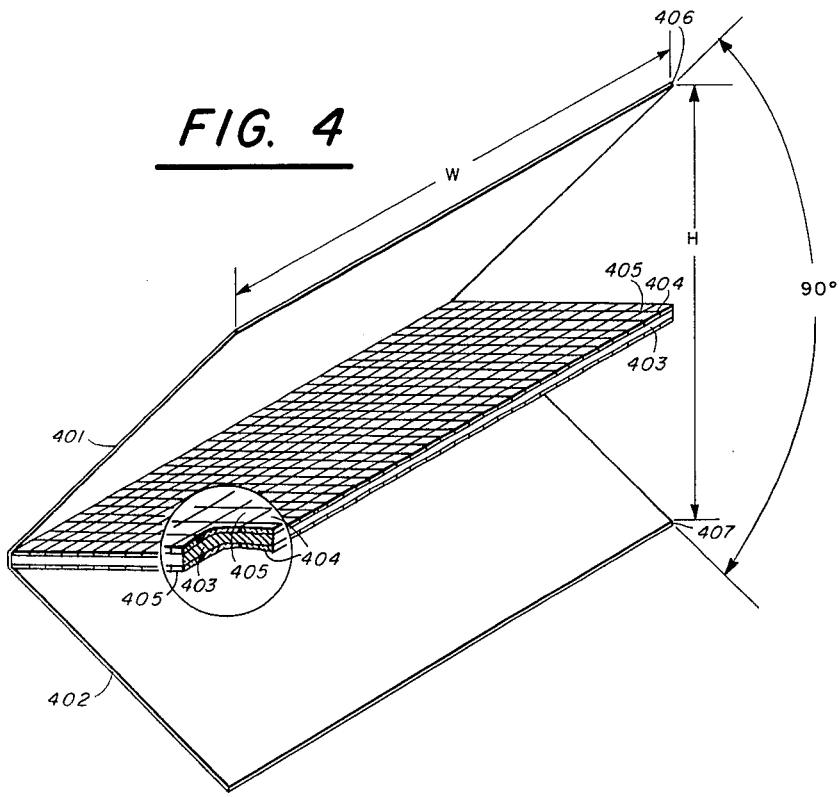
FIG. 4 is a further embodiment of the invention utilizing plane reflectors set at right angles to each other.

The transducer of FIG. 4 would correspond to the embodiment of FIG. 3 if the cones were opened so that they comprise planar surfaces. The reflector of the embodiment of FIG. 4 comprises longitudinally extending plane surfaces 401 and 402 joined along one edge and having an angle of 90° between the surfaces. A rectangular mounting structure 403 is positioned between the reflectors 401 and 402 and is coincident with a plane which bisects the angle between the reflectors. Mounted on both sides of the supporting surface 403 are adjacent rows of transmitting elements and receiving elements. In the diagrammatical showing, a row of transmitting element 404 is positioned next to a row of receiving elements 405 and this configuration would extend from the juncture of the reflecting surfaces 401 and 402 to the outer edge of the supporting member 403. The mosaic of transmitting and receiving elements would be positioned on both sides of the steel supporting member 403.

In this embodiment, as in the embodiment of FIG. 1, directivity in the plane containing the sensitive elements depends on the ratio of $W/\lambda$ where W is the length of the reflector and $\lambda$ is the wavelength at the operating frequency. The directivity in a plane normal to both W and the plane containing the active elements depends on the ratio $H/\lambda$ where H is the distance between points 406 and 407 on reflecting members 401 and 402, respectively.

Figure 5A:
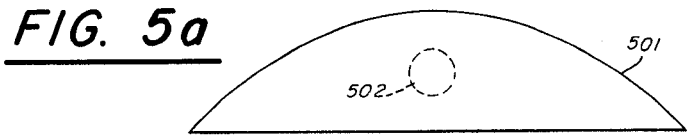
FIG. 5a is a plan view of a further embodiment of the invention utilizing a cylindrical reflector with a parabolic cross section.
Figure 5B:
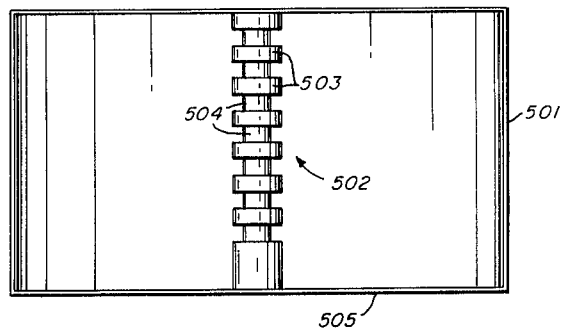

The embodiment of FIGS. 5a and 5b comprises a transducer assembly utilizing a cylindrical reflector of parabolic cross-section. In this instance, the transmit and receive elements of interest would comprise a circular cylinder concentric about the focal line of the reflector. The assembly comprises a reflector 501 having a transmit-receive element assembly 502 mounted on a base 505 of the reflector and having its center axis coincident with the focal line of the reflector 501. The transmit-receive element assembly 502 could be similar to the assembly as set forth in FIG. 2 wherein transmitting elements 503 and 504 are alternately spaced along a supporting member which is then mounted on a base member 505 of the reflector 501. The details of the assembly of transmitting and receiving elements 503 and 504, respectively, could be similar to the construction shown in FIG. 2.

Figure 6A:
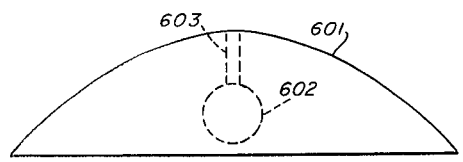
FIG. 6a is a plan view of another embodiment of the invention employing a paraboloidic section as a reflecting element.
Figure 6B:
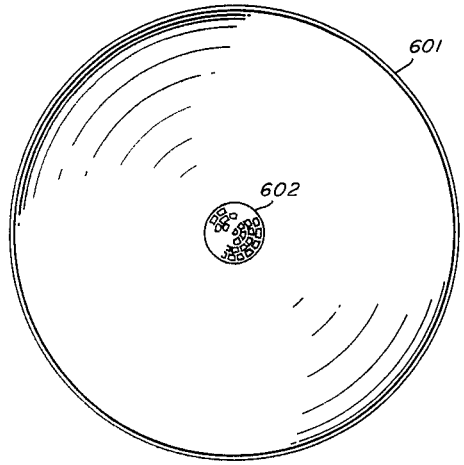

In the embodiment of FIGS. 6a and 6b, a reflector 601 comprises a section of a paraboloid and the active transducer element comprises a circular ball 602 having transmitting and receiving elements positioned thereon. The ball 602 is held in position by mount 603 secured to the reflector 601. In this instance, the center of the spherical surface is concentric with the focal point of the parabolic section which comprises the reflector 601.

FIG. 7 illustrates an embodiment of the invention utilizing a reflector 701 which is a section of a right circular cylinder. The transmitting and receiving mosaics are mounted on a steel supporting member 702 which is shaped in such a fashion that the inner surface thereof facing the reflector 701 comprises a surface of points of equal phase. As can be seen, the shape of the reflector would determine the shape of the surface of the support member 702. Support member is fixed in position with respect to reflector 701 by means of mounting members 703 and 704 at either end of support 702.

Figure 7A:
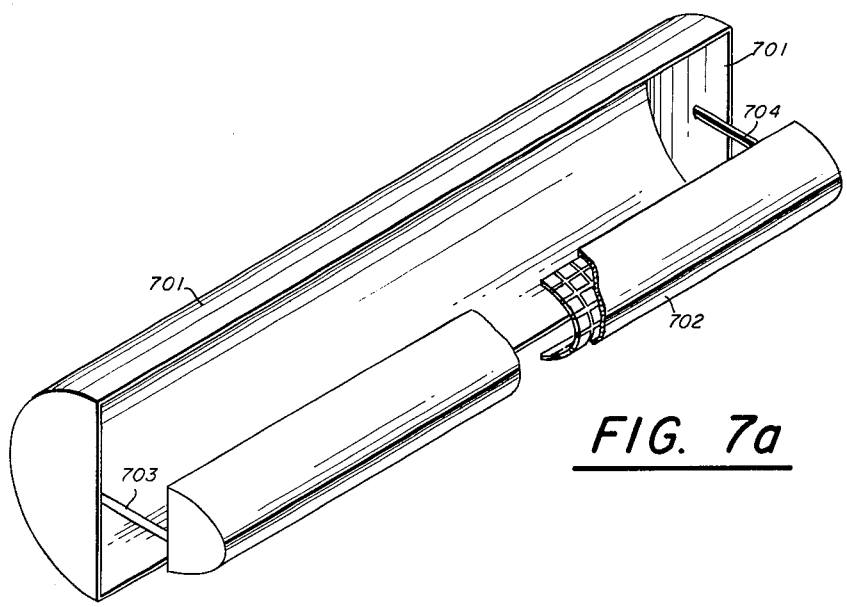
FIG. 7a is a pictoral showing of an additional embodiment of the invention employing a circular cylindric reflector.
Figure 7B:
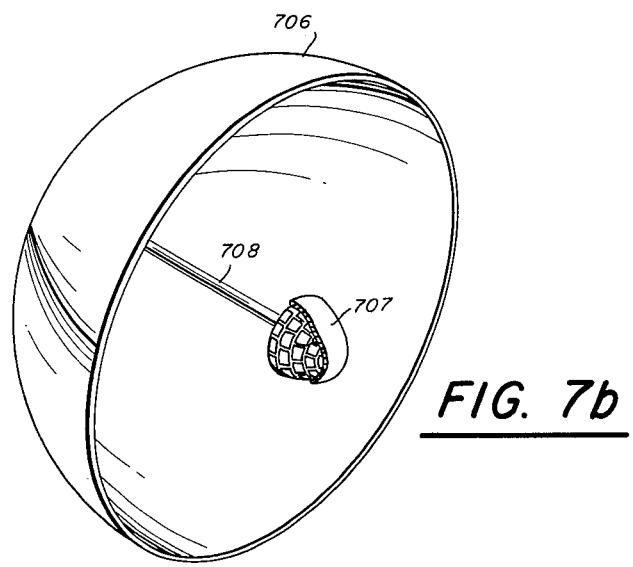
FIG. 7b is a pictoral showing of an embodiment of the invention employing a spherical reflector.

FIG. 7b is a pictorial showing of a modification of FIG. 7a wherein a reflector 706 comprises a spherical section. A support 707 is mounted on strut 708 secured to reflector 706. Transmitting and receiving elements are positioned on the surface of support 707 which faces reflector 706. Again, the inner surface of support 707 comprises a surface such that all points thereon are points of equal phase.

Figure 8B:
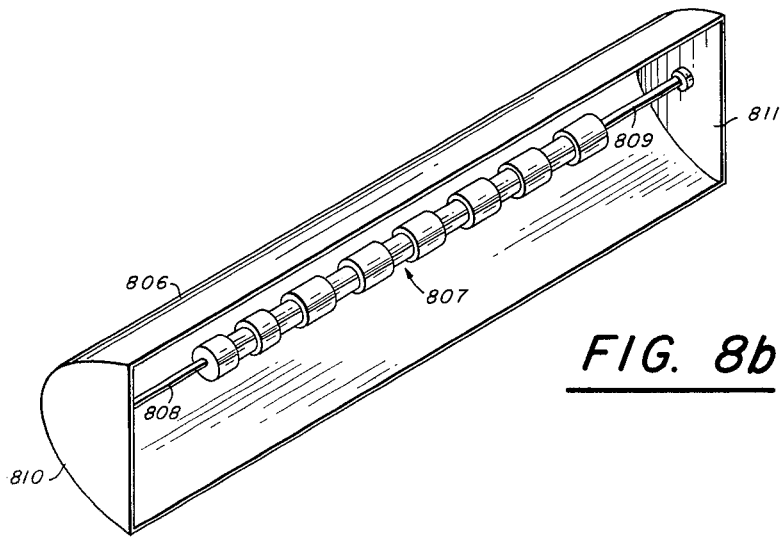
FIG. 8b is an embodiment of the invention employing a section of an elliptic cylinder as a reflector.
Figure 8A:
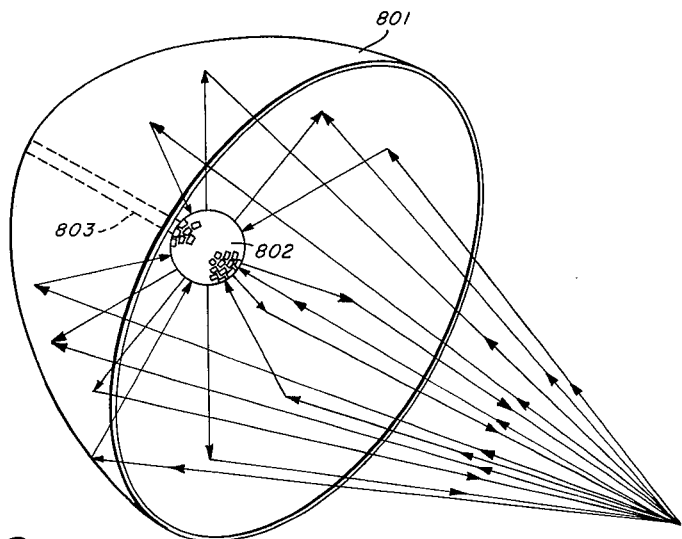
FIG. 8a is another embodiment of the invention employing a reflective element comprising a section of an ellipsoid.

In the embodiment of the invention as set forth in FIG. 8a, a reflector 801 is provided which is a section of an ellipsoid. A spherical support member, as indicated at 802 and mounted on strut 803 which is fixed to a reflector 801 so that sphere 802 is at the focal point of the reflector 801. A mosaic of transmitting and receiving elements is positioned on supported member 802 in alternating relationship.

In the embodiment of the invention shown in FIG. 8b, a reflector 806 comprises a section of an elliptic cylinder and a transducer assembly 807 is positioned so that the axis of the assembly is coincident with the focal line of the reflector 806. The transducer assembly is held in position with respect to reflector 806 by means of struts 808 and 809 secured to end walls 810 and 811 of reflector 806, respectively.

The operation of the structure of the invention will be illustrated with respect to the embodiment of FIGS. 1 and 2 wherein the structure utilizes the same acoustic reflector 26 for simultaneous transmission and reception of sound waves. This can be accomplished since the transmitting and receiving elements 16 and 18, respectively, are mounted on a common assembly in segmented fashion within the reflector and are isolated from each other. Accordingly, when an electric signal is applied to the transmitting elements 16 by a tranmitter unit, not shown, the elements 16 vibrate in response to the applied electric signal and thus, impart in-phase vibrations to the medium surrounding the transducer assembly. The sound waves generated by elements 16 are reflected by the reflector and are directed in a beam parallel to the axis of the cone until reflected by an object in the medium. The wave fronts of the echo or other sound sources coming along the direction of the axis of the reflector are reflected by the reflector in the direction of the vibration sensitive receiver elements 18 as shown in FIG. 1. That is to say, the reflected wave front is bent or folded back at a 90° angle to strike the receiver elements in phase. The sound waves striking the vibration sensitive receiver elements cause the elements 18 to vibrate and, thus, produce an electrical signal which is coupled to a receiver, not shown.

In FIG. 2 the transmitter elements are shown as being of a larger diameter than the receiver elements and, in addition, the receiver elements extend completely to the end of the support member 14 while the transmitter elements are interleaved with the receiver elements only to an extent which approximates ⅔ the length of the support member. This is done in order that side lobes may be suppressed and so that the receiver and transmitter elements have a slightly different directivity pattern with respect to one another. Thus, looking at FIG. 1b which is a pictoral representation of the pattern produced looking into the bell of the reflector 25, 26 and if one could see the wave front that is propagated, one would see that the receiver elements are looking into a greater area than the transmitter elements are transmitting into. This is shown in FIG. 1a wherein the diameter of the bell corresponding to the received area is represented by D and the diameter of the area that the transmitter is sending into corresponds to d.

Figure 9:
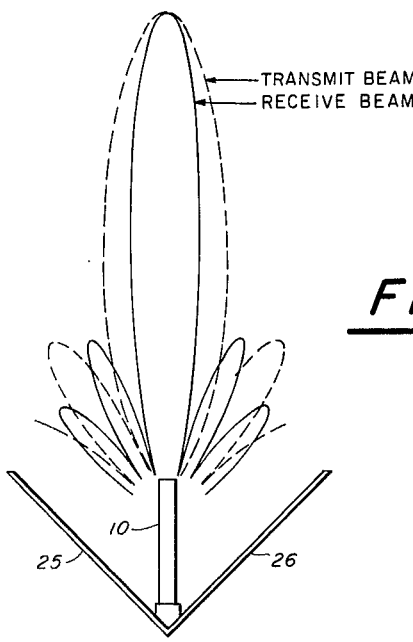
FIG. 9 is a diagrammatic showing of transmit and receive beams illustrating side lobe suppression and beam patterns for one embodiment of the invention.

In addition, these effective diameters (D and d) can be so selected that the transmitting and receiving beam side lobes are interlaced such that the first side lobe of the receiving beam appears at the angle at which the first minimum response appears for the transmitting beam. Similarly, the first side lobe of the transmitting beam can be made to appear at the angle at which the second minimum response appears for the receiving beam, and thus, the transducer looks only along the main beam. Such a situation is illustrated in FIG. 9 wherein the unit comprising reflector 25, 26, transducer element 10 and illustrative receive and transmit beams are shown.

The manner in which the transmitting and receiving elements are mounted, foiled, interconnected, etc., is not gone into in great detail for various of the embodiments in that the construction of active elements using a mosaic technique is old and well known. Such techniques are set forth for example in NDRC, volume 7, Principles and Applications of Underwater Sound, 1946, pp. 138–141.

From the foregoing it may be seen that by varying the dimensions and the positioning of the transmitting and receiving elements with respect to one another, various relationships between the transmitting and receiving directivity patterns may be obtained and side lobe suppression may be effected.

From the foregoing it may also be seen that it is possible to attain a transducer assembly for simultaneous transmission and reception which is lightweight, compact, yet, however produces characteristics which are dependent primarily on the shape of the reflector and the physical dimensions of the reflector. In contradistinction thereto, the prior transducer assemblies depend on the size and shape of the active elements themselves to obtain the desired directivity beam widths and patterns. This required that for simultaneous transmission and reception, using very narrow beam widths, the transducer assembly be inordinately cumbersome, heavy and expensive.

By utilizing the present structures, described herein, a transducer assembly may be made relatively small and lightweight, yet having the characteristic beam widths, directivity patterns and side lobe suppression, etc., most often required.

Obviously, many modifications and variations of the present invention are possible in the light of the above teachings. It is, therefore, to be understood that within the scope of the appended claims the invention may be practiced otherwise than as specifically described.

What is claimed is:

1. In a device of the character described; reflector means for simultaneously reflecting a plurality of beams of received and transmitted energy; mounting means positioned within said reflector means; first and second groups of vibratile elements disposed on said mounting means, said first group of vibratile elements adapted to vibrate and generate compressional waves when electrically excited; said second group of vibratile elements adapted to generate electrical waves when vibrated; said first and second groups of elements being adapted for simultaneous transmission and reception of beams of energy to and from said reflector means respectively.

2. A device as set forth in claim 1 wherein said reflector means comprises a 90° conical reflector having a center axis, and wherein said mounting means comprises a longitudinally extending member having an axis coextensive with the center axis of said reflector.

3. In a device of the character described comprising; a reflector, a cylindrical mounting positioned within said reflector; a plurality of crystal ring elements on said mounting in end to end relationship; conducting means connected to a first group of said elements and adapted to be connected to a source of electrical wave energy, said first group of elements being adapted when electrically excited to vibrate and generate compressional waves; other conducting means connected to a second group of said elements and adapted to be connected to a receiver of electrical wave energy; said second group of elements being adapted when mechanically vibrated to generate electrical waves; said reflector and said groups of elements being relatively spaced for simultaneous transmission and reception of energy in distinct energy field pattern configurations.

4. A device of the character described comprising; a reflector; a cylindrical mounting positioned within said reflector; a first and second group of interleaved crystal ring elements on said mounting in end to end relationship; metallic means on the inner and outer surfaces of said elements; first conducting means connecting in parallel to the metallic means on the inner and outer surfaces of said first group of elements adapted to be connected to a source of electrical wave energy, said first group of elements being adapted when electrically excited to vibrate and generate compressional waves; second conducting means connected in parallel to the metallic means on the inner and outer surfaces of said second group of elements and adapted to be connected to a receiver of electrical wave energy, said second group of elements being adapted when mechanically vibrated to generate electrical waves; said reflector and said first and second groups of elements being relatively spaced for simultaneous transmission and reception of energy in distinct energy field pattern configurations.

5. A device of the character described comprising in combination; reflector means having an axis of symmetry; mounting means having an axis and positioned within said reflector so that said axis coincides with said axis of symmetry; a first plurality of electro-acoustic elements disposed along said axis for radially directing sound waves to said reflector for projection therefrom in a beam parallel to said axis; a second plurality of electro-acoustic elements in interleaved arrangement with said first plurality of electro-acoustic elements; said second plurality of elements being adapted for receiving sound waves radially directed thereto from the reflector upon reaching said reflector along a path parallel to said axis.

6. A device of the character described comprising in combination; reflector means having an axis of symmetry; mounting means positioned within said reflector and having an axis coincident with said axis of symmetry; a first plurality of electro-acoustic elements disposed along said axis for radially directing sound waves to said reflector for projection therefrom in a beam perpendicular to said axis; a second plurality of electro-acoustic elements in interleaved arrangement with said first plurality of electro-acoustic elements, said second plurality of elements being adapted for receiving sound waves radially directed thereto from the reflector upon reaching said reflector on a path perpendicular to said axis.

7. A device as set forth in claim 6 wherein said first plurality of elements has a different radius than said second plurality of elements.

8. A device as set forth in claim 6 wherein said first plurality of elements has a larger radius than said second plurality of elements.

9. An integral directional electro-acoustic transducer capable of simultaneous reception and transmission of sound energy over substantially the same range of frequencies comprising; sound reflecting means; mounting means positioned in reflection proximity to said reflecting means; electro-acoustic transmitting elements carried by said mounting means; a plurality of electro-acoustic receiving elements carried by said mounting means; said transmitting and said receiving elements being relatively spaced on said mounting means to define separate and distinct transmitting and receiving energy patterns, said transmitting elements and receiving elements being adapted for simultaneous transmission and reception over substantially the same or similar range of frequencies with a minimum of cross-talk.

10. The integral electro-acoustic transducer as set forth in claim 9 wherein said transmitting and receiving elements are mounted in alternate relationship with each other.

11. The integral directional electro-acoustic transducer as set forth in claim 9 wherein said reflecting means is a conical reflector and said mounting means is a cylindrical element having its center line coincident with the axis of revolution of said conical reflector.

12. An integral directional electro-acoustic transducer capable of simultaneous reception and transmission of sound energy over the same range of frequencies comprising; sound reflecting means; mounting means positioned in reflection proximity to said reflecting means; a plurality of electro-acoustic transmitting elements carried by said mounting means; a plurality of electro-acoustic receiving elements carried by said mounting means; said transmitting elements disposed in a predetermined relationship with said reflector so that a particular radiation pattern is defined; said receiving elements disposed in a different predetermined spatial relationship with said reflector for defining a particular reception pattern; said radiation pattern and said reception pattern being separate and distinct from each other so that said receiving and transmitting elements are adapted for simultaneous transmission and reception over same range of frequencies with a minimum of cross-talk.

References Cited by the Examiner

UNITED STATES PATENTS

| | | | |
|---|---|---|---|
| 1,985,251 | 12/1934 | Hayes | 340—9 |
| 2,064,911 | 12/1936 | Hayes | 340—9 |
| 2,443,177 | 6/1948 | Beechlyn | 340—11 |
| 2,617,874 | 11/1952 | Lewis | 340—11 |
| 2,878,886 | 3/1959 | Overton. | |
| 2,922,140 | 1/1960 | Levine | 340—9 |
| 3,007,133 | 10/1961 | Padberg | 340—12 |
| 3,021,504 | 2/1962 | Toulis | 340—8 |
| 3,113,286 | 12/1963 | Miller | 340—16 |

CHESTER L. JUSTUS, *Primary Examiner.*

J. W. MILLS, G. M. FISHER, *Assistant Examiners.*